INVENTORS
RICHARD W. LYDAY
CLETUS L. MOORMAN

BY Albert H. Reuther
THEIR ATTORNEY

Aug. 10, 1965    R. W. LYDAY ETAL    3,199,187
FASTENER ASSEMBLY PROCEDURE
Original Filed June 22, 1961    7 Sheets-Sheet 6

Fig. 8

INVENTORS
RICHARD W. LYDAY
CLETUS L. MOORMAN
BY
THEIR ATTORNEY

INVENTORS
RICHARD W. LYDAY
CLETUS L. MOORMAN
BY
THEIR ATTORNEY

United States Patent Office 3,199,187
Patented Aug. 10, 1965

3,199,187
FASTENER ASSEMBLY PROCEDURE
Richard W. Lyday, Brookville, and Cletus L. Moorman, Trotwood, Ohio, assignors to General Motors Corporation, Detroit, Mich., a corporation of Delaware
Original application June 22, 1961, Ser. No. 118,836, now Patent No. 3,139,674, dated July 7, 1964. Divided and this application Oct. 28, 1963, Ser. No. 319,327
4 Claims. (Cl. 29—453)

This application is a division of parent disclosure Serial No. 118,836—Lyday et al., filed June 22, 1961, now Patent 3,139,674—Lyday et al. issued July 7, 1964, belonging to the assignee of the present invention.

This invention relates to mechanism and procedure to assemble articles of manufacture such as fastening devices to elastomeric sealing strip means.

An object of this invention is to provide a new and improved mechanism and procedure for elastomeric sealing strip and mounting device assembly free of necessity for stopping the sealing strip feeding in predetermined locations or stations.

Another object of this invention is to provide assembly apparatus or fixture means to install plastic fastening devices for a continuously moving elastomeric sealing strip means which need not be stopped for insertion stations because a multi-position rotatable head can effect placement of oblong-headed nail-like fastening devices.

Another object of this invention is to provide a rotational mechanism to assemble plastic fastening devices with elongated heads into lateral holes provided for access to a continuously-extending longitudinal cavity of an extruded elastomeric sealing strip means which is movable at a predetermined speed as carried by a nest-like portion while a fastening device is oriented and loaded in one positioning of one of a pair of hollow reciprocable sleeve-like members shiftable by cam actuation in response to movement of an assembly head at a speed of rotation slightly greater than rate of travel of the strip means in order to elongate the hole sufficiently to permit entry of the elongated head, there being a corresponding reciprocable sleeve-like member loadable with another fastening device upon release of a previous fastening device from the other reciprocable sleeve-like member.

A further object of this invention is to provide a completely mechanical system for use on apparatus to assemble plastic nail-like fastening devices in predetermined locations along the elastomeric sealing strip having a longitudinally extending cavity adjacent to an underside thereof and including nest-like feeder means in which the elastomeric sealing strip is retained for movement in a predetermined path along which tripping an actuator can effect rotation of an assembly head at a speed of rotation tangentially slightly greater than rate of travel of strip means in order to elongate an access hole to the cavity as an elongated head of the fastening device enters the hole in the strip to elongate the same to permit a trailing edge of the head to enter the hole, there being a pair of substantially diagonally reciprocable sleevelike members subject to rotation and shifting axially thereof in response to following of roller means carried by the members and engageable in a cam track such that the sleeve-like members move longitudinally of rods fixedly carried by the assembly head and having one end thereof disposed to abut against a fastening device for positive ejection thereof upon completed insertion of the fastening device to a sealing strip which does not have to effect transmission of force to remove the fastening device from a sleeve-like member, one of the reciprocable sleeve-like members being retracted and returned to loading position while the counterpart thereof is in an insertion part of a cycle of operation.

Another object of this invention is to provide a plastic fastening device for use specifically with an elastomeric sealing strip having a longitudinally extending cavity adjacent to an underside thereof and having a body including an elongated head portion of a length in a range between two to three times diameter of largest diameter of a stem portion integral on one side of the head portion and having a plurality of concentric rings centrally along the stem portion which can have a hollow end for radial resilience though outer peripheral surfacing of the end has an initial angular taper which increases toward the head portion though interrupted by a substantially uniformly cylindrical portion located intermediate the initial angular taper and adapted to align the fastening device axially with respect to a mounting aperture having a peripheral edge subject to interference press fitting engagement by the concentric rings at least one of which is provided with a secondary angular taper, the elongated head portion having hook-like opposite ends remote from each other though extending in a direction toward the stem portion.

Further objects and advantages of the present invention will be apparent from the following description, reference being had to the accompanying drawings wherein preferred embodiments of the present invention are clearly shown.

In a copending application Serial No. 126,419, filed June 22, 1961 and belonging to the assignee of the present invention, there is a disclosure of apparatus and method of manufacture to assemble elastomeric sealing strip means and fastening devices to each other requiring multi-station stopping of movement of a sealing strip means. Further disclosure as to the sealing strip means per se can be found in application Serial No. 71,463, filed November 25, 1960, now U.S. Patent 3,110,938, dated November 19, 1963, and belonging to the assignee of the present invention. The sealing strip can be extruded or molded to have a preformed shape subject to mounting adjacent to a vehicle door, for example, as well as any other peripheral edge of an opening subject to closure by a cover and the like. In the aforementioned application Serial No. 126,419 filed June 22, 1961, there is provision for aperturing an underside of a sealing strip so as to provide access to a longitudinally extending cavity in which head portions of plastic nail-like fastening devices such as disclosed in a copending application Serial No. 118,918, filed June 22, 1961, now Patent 3,139,784—Moorman et al. issued July 7, 1964 and belonging to the assignee of the present invention, can be installed in a subsequent station where a stop is made to permit further mechanism to dilate the hole or aperture formed in the sealing strip. Each of the embodiments of inserter mechanism for use in the second station of the previously noted apparatus requires a stop to be made in response to solenoid switch actuation by a peg or pin projecting from a feeder means. The present disclosure relates to inserter mechanism and procedure for use in place of the inserter mechanism disclosed in the aforementioned copending application and adapted for use subsequent to aperturing of the sealing strip means for access to a longitudinally extending cavity therein. Thus, it is to be noted that the aperturing can be accomplished by a drilling operation and the like which can occur either by having a brief interruption of the movement of the sealing strip prior to assembly of fastening devices to elastomeric sealing strip means or by indexing a drilling means of a type shown in the copending application such that such drilling means also moves concurrently to follow a longitudinal path of movement of a sealing strip means while performing a drilling operation. However, the performance of such a prior aperturing does not form part of the present invention and inserter mechanism, assembly apparatus, or fixture means generally indicated by numeral 20 in views of FIGURES 1, 2 and 3 of the drawings can effect installation of plastic fastening devices for a continuously moving elastomeric sealing strip means which need not be stopped for insertion stations because of mechanical structural features in accordance with the present invention.

Figure 1:
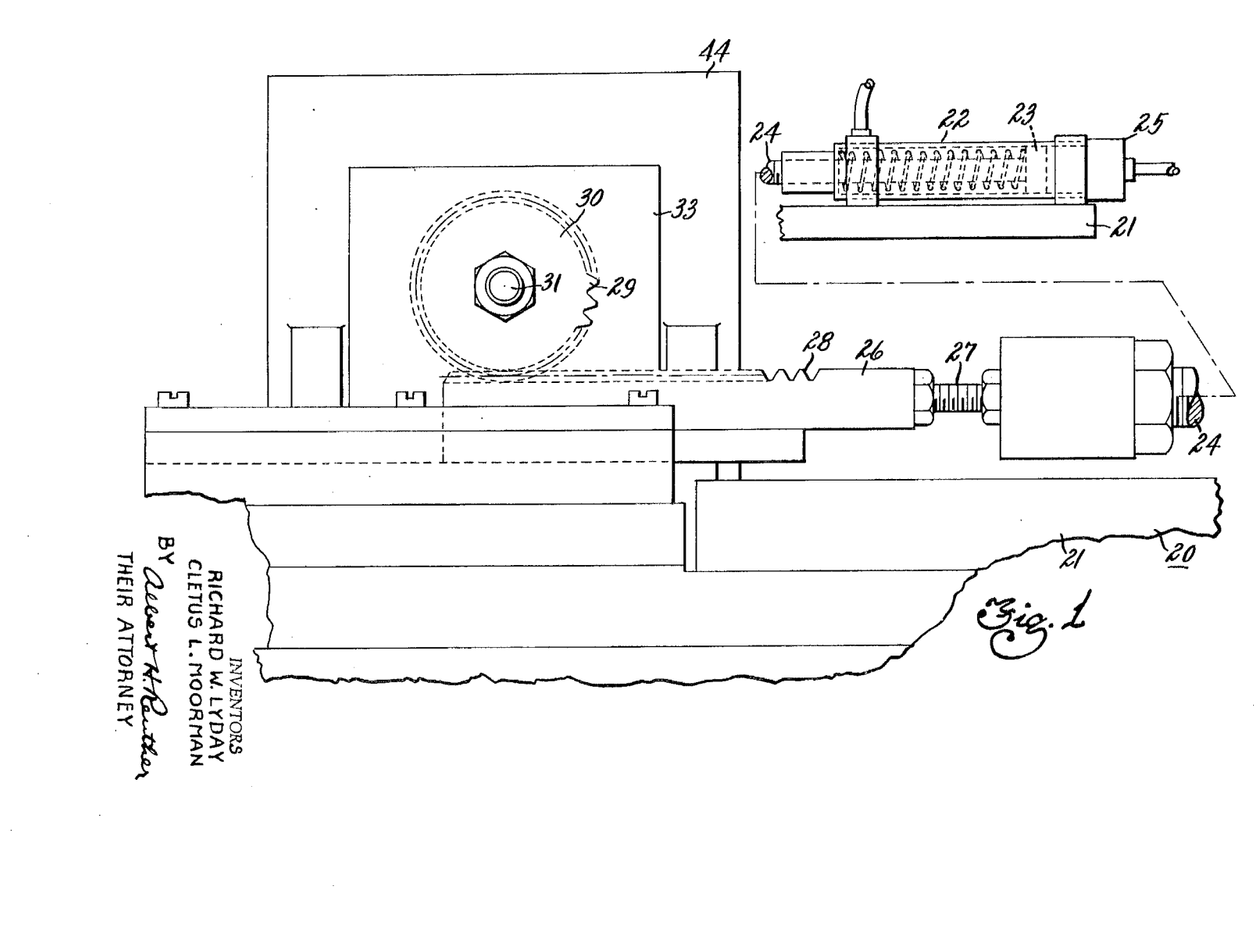
FIGURE 1 is an end view of apparatus or mechanism in accordance with the present invention.

The apparatus or mechanism 20 includes a base portion 21 on which a fluid cylinder 22 can be carried or mounted by suitable clamps and the like and inside of which a piston 23 having a rod portion 24 reciprocable therewith in a to and fro movement accomplished in response to actuation or tripping of a flow control valve 25 which can control speed of to and fro movement of a rack 26 suitably journalled or coupled to the rod 24 by adjustable fittings 27 as visible in FIGURE 1 of the drawings. Flow control valve 25 can be actuated in any suitable manner such as by pegs or pins which can engage a switching means to control solenoid energization as noted in copending application Serial No. 126,419 wherein similar structure is provided to effect actuation of the drilling means as well as an actuator effective to operate inserter mechanism. The specific tripping mechanism forms no part of the present invention which relates particularly to a rugged inserter mechanism that avoids use of multiple spring means during assembly of a plastic nail-like fastening device to a laterally apertured sealing strip means having a cavity extending longitudinally along one side thereof.

The reciprocable rack 26 has a plurality of teeth or projections 28 adapted to mesh with external projections or teeth 29 of a gear or pinion 30 carried by one end of a shaft 31 suitably journalled by bearing means 32 for rotation relative to an upwardly extending support portion 33 carried by the base portion 21. An end of the shaft 31 in a location remote from the pinion 30 is provided with a splined coupling including a first portion 34 which can be held to the shaft 31 by a key 35 as well as a set screw 36 visible in FIGURE 3. This spline coupling can include meshing engagement of teeth between the first portion 34 and a second portion 38 adapted to be mechanically driven thereby though adapted to permit limited axial shift for possible misalignment of components to effect driving of inserter mechanism in accordance with the present invention. The second portion 38 includes an integral reduced diameter portion 39 engageable by a plurality of rolls R and the like of a one-way clutch means generally indicated by numeral 40 secured by a key connection 41 to one end of a shaft-like portion 42 suitably journalled for rotation with respect to bearing means 43 press fitted to a mounting portion 44 carried by the base portion 21 as well as further bearing means 45 press fitted to a cam plate 46 having a cam track 47 on one side thereof. The shaft portion 42 and bearings 43 and 45 for journalling thereof can be best seen in the view of FIGURE 3.

Figure 4:
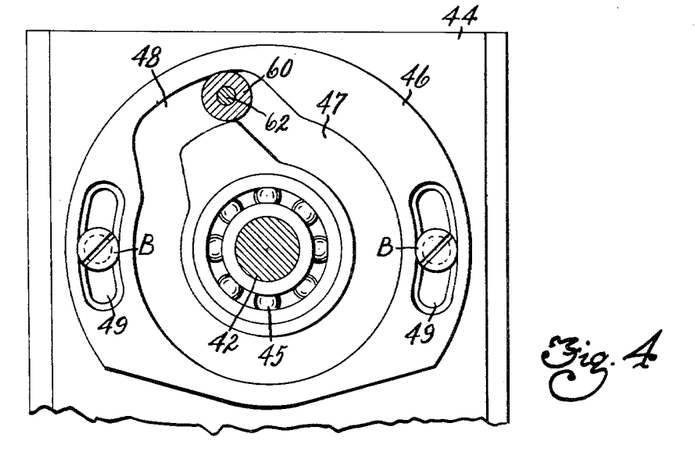
FIGURE 4 is a sectional view taken along line 4—4 in FIGURE 3.

FIGURE 4 shows more clearly how the cam plate 46 is adjustably mounted on one side of the mounting portion 44. The cam track 47 includes an offset portion 48 that can be variously positioned for reasons described further in subsequent paragraphs. A pair of arcuate cutouts or slots 49 through which cap screws or bolts B can be fastened to the mounting portion 44 permit tightening and loosening and vice versa of the cam plate 46 into predetermined positioning of the offset portion 48 of the cam track 47.

Figure 2:
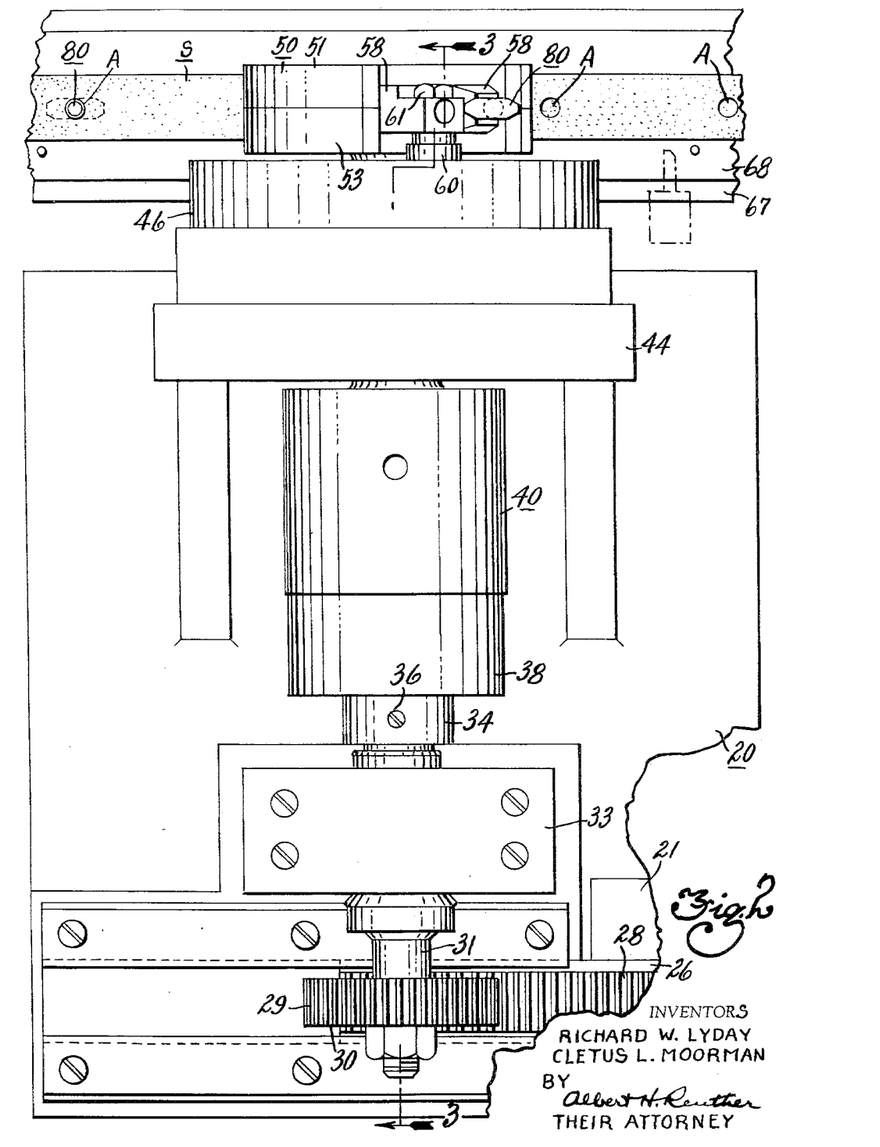
FIGURE 2 is a plan view of the mechanism of FIGURE 1.
Figure 3:
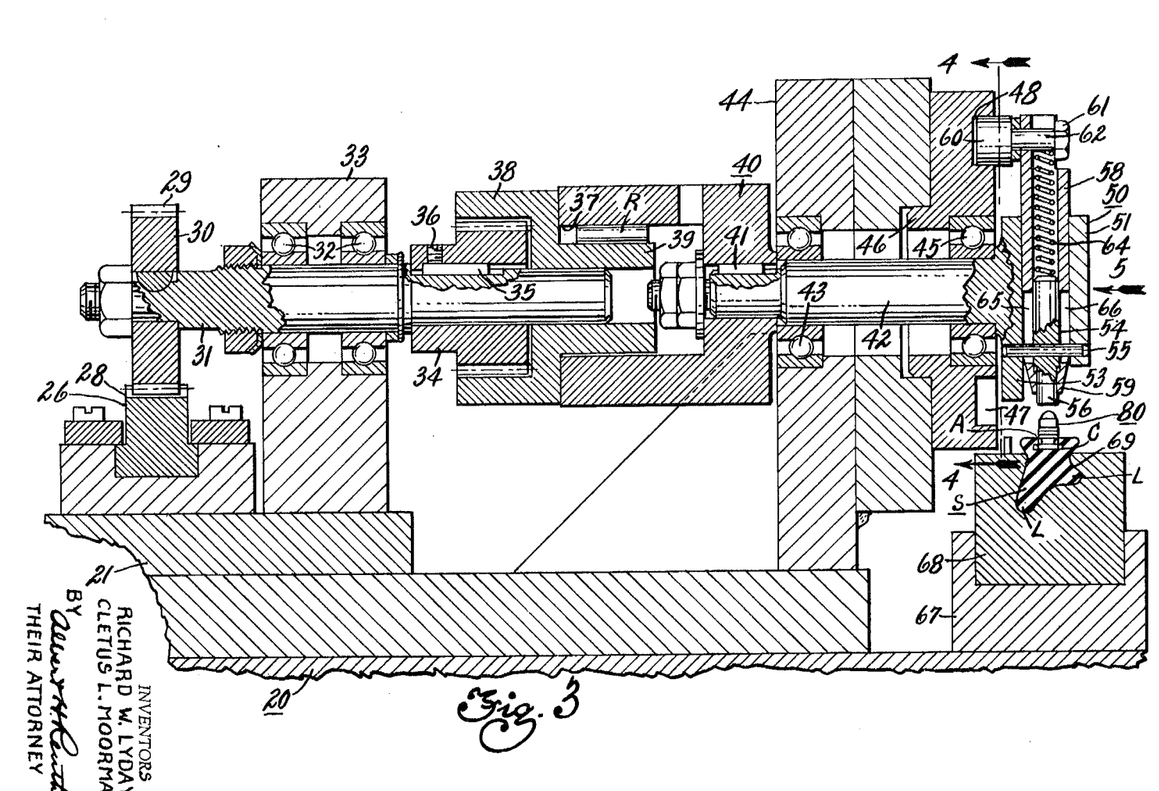
FIGURE 3 is a cross-sectioned elevational view taken along line 3—3 in FIGURE 2.
Figure 5:
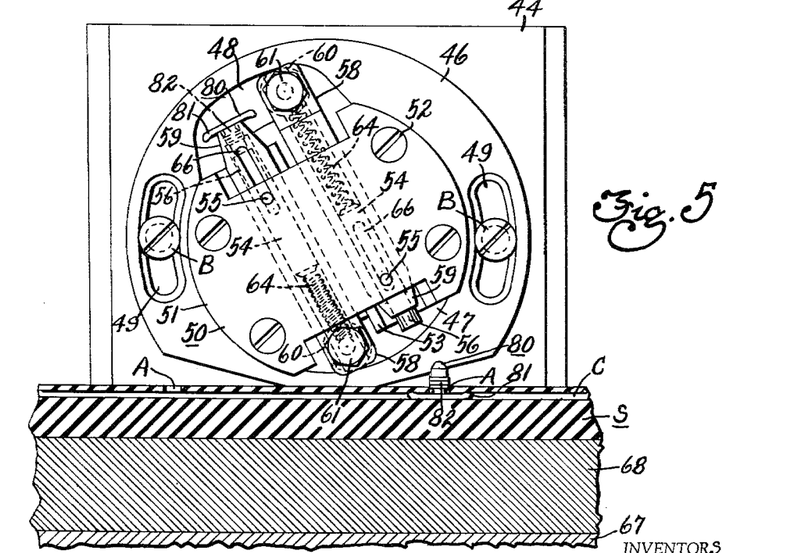
FIGURE 5 is a view taken in the direction of arrow 5 in FIGURE 3 to illustrate an assembly head with reciprocable sleeve-like members, one of which is in loading position for a fastening device on an end of one member.

As assembly head generally indicated by numeral 50 in FIGURES 2, 3 and 5 can provide structural features and components in accordance with the present invention. The assembly head 50 includes an end plate or cover portion 51 secured by plural cap screws or bolts 52 to a yoke or transverse portion 53 carried by one end of the shaft portion 42 and rotatable together therewith in response to rack and pinion operation to transmit intermittent rotative force as governed by the one-way clutch means 40 mentioned earlier. It is to be noted that the fluid cylinder 22 shown in FIGURES 1 and 2 can be either hydraulically or pneumatically operated and can be provided with either a reciprocable piston as noted or with a bellows or other suitable components forming no part of the present invention. The one-way clutch means 40 operates in a conventional manner such as by having the rollers R cooperable with suitable cam surfaces between outer and inner portions 37 and 39, respectively, such that the clutch means can prevent the assembly head 50 and shaft portion 42 for journalling thereof from moving backwards or in a reverse direction during retraction of the rack 26 upon completion of substantially 180° or semicircular movement of the assembly head 50 during a first portion of a cycle of operation of components in the inserter mechanism or system in accordance with the present invention.

As best seen in views of FIGURES 3 and 5, the assembly head 50 further includes a pair of substantially diagonally located rods or stationary guides 54 fixed or anchored by transverse pins or dowels 55 press fitted between end plate 51 and yoke portion 53. Each rod or guide portion 54 includes an end projection 56 integrally fixed thereto for a purpose noted in a subsequent paragraph. A pair of hollow or sleeve-like diagonally reciprocable members 58 are carried or guided longitudinally relative to the rod or guide portions 54. Each of these substantially diagonally reciprocable sleeve-like members 58 includes a tapered end 59 extending in a direction opposite to that of the other and correspondingly each of the opposite ends thereof is provided with a roller means 60 adapted to follow the cam track 47 and offset 48 of the cam plate 46. Each of the rollers is secured by suitable fastening means such as cap screws 61 immediately adjacent to an end of each of the sleeve-like members 58 in a location remote from the tapered hollow end 59. A shank portion 62 of the fastening means 61 traverses the hollow interior of the sleeve-like member 58 adjacent to an end thereof and provides an abutment or limit stop engaged by one end of a spring means 64 having an opposite end abutting against or in engagement with an end of the rod or guide portion 54 at a location remote from the end projection 56 thereof. This spring means can include at least one coil spring or plural concentrically located coil springs effective to bias and resiliently urge the roller 60 journalled to one end of the shank portion 62 away from the rod or guide portion 54. It is to be noted that to and fro movement of each of the sleeve-like members 58 is further limited and guided by a pair of lateral cutouts or slot-like windows 65 and 66 extending from opposite sides of the hollow interior of the sleeve-like members as best seen in FIGURE 3. The pin or dowel 55 fixed between end plate 51 and yoke portion 53 is engaged by peripheral end surfaces of these cutouts 65–66 to define limit of reciprocable movement of the sleeve-like members 58.

Figure 6:
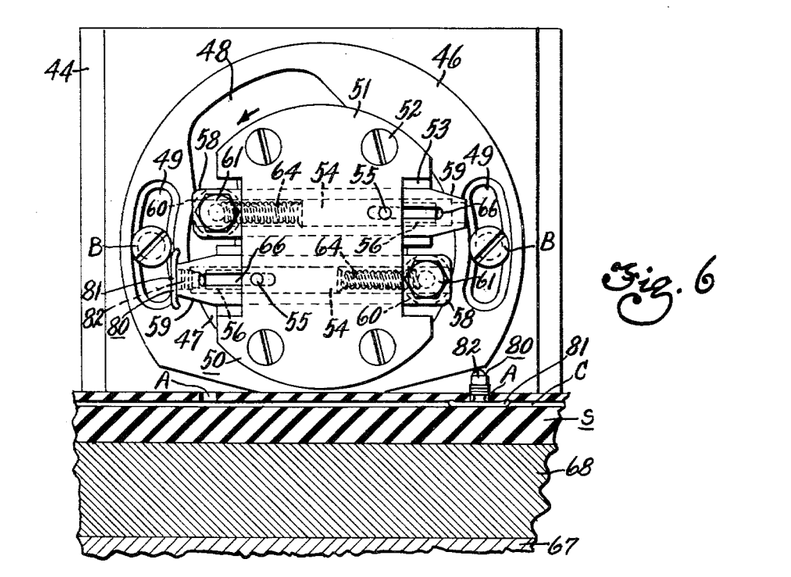
FIGURE 6 illustrates structure of FIGURE 5 as cam-controlled rotative movement begins at a rate of speed tangentially greater than rate of feeding movement of a sealing strip means adjacent thereto.

As can be seen in FIGURE 3, a substantially U-shaped track 67 can be mounted adjacent to the base portion 21 and a feeder means 68 having a cavity 69 therein can be passed through and along the U-shaped track 67 so as to effect movement of a sealing strip generally indicated by S in a location radially below and in alignment with the assembly head 50. The sealing strip can include an extruded elastomeric body having integral lip portions L which fit snugly in complementary relation to the recess or channel-like grooves 69 in the feeder means 68. The sealing strip means S further includes a longitudinally extending cavity C to which lateral access is provided by openings or apertures A that can be provided in predetermined spaced locations by drilling means as disclosed in the previously mentioned copending application. It is through these openings or apertures A that plastic fastening devices generally indicated by numeral 80 can be fitted to components of the assembly head 50 for progressive inserting movement as illustrated in views of FIGURES 5 through 8. The view of FIGURE 5 illustrates the assembly head 50 with the pair of reciprocable sleeve-like members one of which is in loading position to receive a fastening device 80 having an elongated or oblong head portion 81 integral with a stem portion 82. The stem portion 82 is fitted snugly to an inner peripheral surface of the hollow tapered end 59 when the latter is located adjacent to the offset portion 48 of the cam track 47. The tapered end 59 of this one sleeve-like member 58 is in this upper-lefthand location at a time when the roller 60 carried by the other sleeve-like member 58 has just entered the offset portion 48 forming part of the predetermined path of the cam track 47. Any suitable chute or loading channel can be provided together with suitable gravity feed or mechanical as well as manual insertion of the fastening devices 80 to one such hollow tapered end 59 when the latter is in loading position illustrated by FIGURE 5. Immediately subsequent to loading of a fastening device 80 to the hollow tapered end 59, there can be a tripping or actuation of the fluid cylinder such as 22 to effect rack-pinion movement and engagement of clutch means 49 in one direction to effect 180° movement an initial stage of which is represented by an illustration of FIGURE 6. It is noted that the head screws or bolts B which govern positioning of the cam plate 46 in conjunction with slots 49 therein is such that the particular angular offset of the cam portion 48 can be regulated to control positioning of the tapered end as the latter makes an acute angle in loading position relative to a vertical line theoretically extending through the axis of rotation of the shaft portion 42. As the assembly head 50 continues the substantially 180° rotative movement as represented in an illustration of FIGURE 7, it is to be noted that the rollers 60 carried by each of the sleeve-like members 58 are urged radially inwardly against force of spring means 64 such that the rollers 60 traverse a substantially circular or angular path substantially coinciding for each of the rollers at all times except when one of the rollers enters and traverses the offset cam portion 48.

Figure 7:
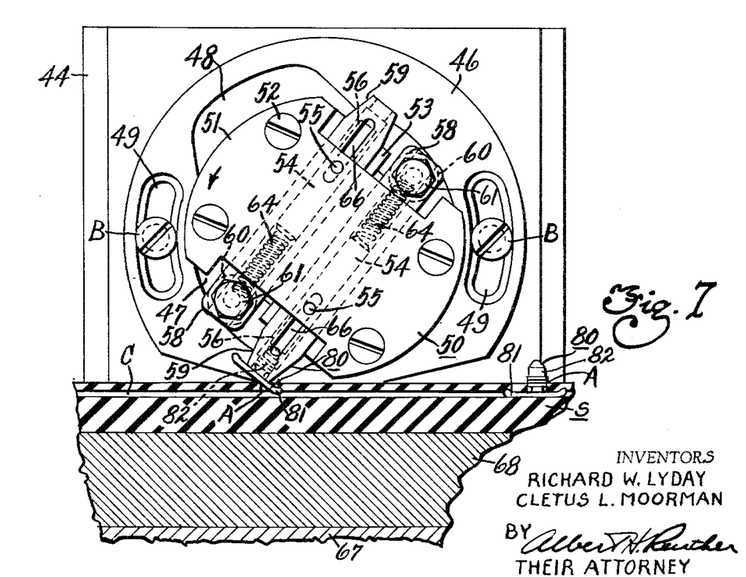
FIGURE 7 illustrates a fastening device carried by one member as the fastening device begins to enter a hole in the sealing strip means.
Figure 8:
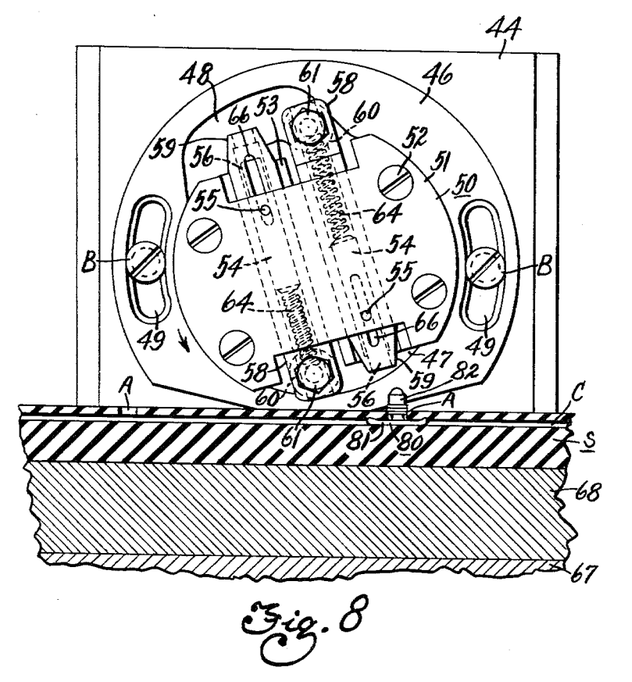
FIGURE 8 illustrates ejection and release of a fastening device inserted and assembled dynamically to the moving sealing strip means.

FIGURE 7 illustrates positioning of the assembly head 50 as a fastening device 80 has one end of the oblong or elongated head portion 81 thereof entering an aperture A of the sealing strip means S in accordance with the present invention. It is to be noted that during rotative movement of the assembly head 50 there is coincident feeding tangentially of the sealing strip S along a path substantially radially in alignment with the assembly head 50 and particularly the one tapered end 59 of one of the pair of sleeve-like reciprocable members 58. The sealing strip feeding movement does not have to be interrupted or stopped during inserting of the fastening device 80 and speed of rotation of the assembly head 50 is tangentially slightly greater than rate of travel of the strip means in order to elongate the access hole or aperture A of the elastomeric sealing strip S during the inserting procedure. A free end of each of the stem portions of the fastening devices 80 can abut against the projection end 56 of the rod or guide portion 54 which cannot move substantially radially either inwardly or outwardly. Thus, the projection end 56 provides radial backing for the stem portion 82 during inserting of the fastening device 80 as the edge or end of the oblong or elongated head portion engages the hole or aperture A of the sealing strip S of elastomeric material. The assembly head 50 rotatably traverses an angular distance of slightly less than or substantially equal to 90° from a position where the plastic nail-like fastening device first engages the sealing strip as represented in FIGURE 7 to a location where automatic ejection of the fastening device occurs as represented in a view of FIGURE 8. The substantially diametrically opposite slots 49 permit change of angle at the location where ejection occurs and half-circle rotation of the assembly head 50 ends during a portion of time that can be controlled by a suitable delay device as to operation of the fluid cylinder 22 and flow control valve 25. Upon ejection of a fastening device a subsequent roller 60 has entered the offset cam portion 48 and loading of a subsequent fastening device can be effected relative to a tapered hollow end portion 59 of the other of the sleeve-like reciprocable members 58. Each of the inner peripheral surfaces of the hollow tapered ends 59 can be provided with grooves or irregularities in surfacing to permit interference fit of concentric rings on a stem portion 82 of each of the fastening devices 80 such as described in further detail in a subsequent paragraph.

The sealing strip must move more slowly than tangential rotative movement of the assembly head 50 during rotative cycling thereof so that the oblong head portion 81 of a fastening device 80 can stretch the elastomeric material of the sealing strip S sufficiently to permit the remaining or trailing end of the oblong head portion to snap fit into place at a time when ejection of the fastening device occurs from the hollow tapered end 59 of the sleeve-like reciprocable member 58. It is to be noted that the elastomeric sealing strip does not have to apply any force to pull a nail-like plastic fastening device 80 out of the hollow end 59 of the reciprocable member 58. In the angular position where ejection occurs there is simultaneous resilient biasing of the particular sleeve-like member 58 under urging of spring means 64 to effect entry of one of the roller means 60 into the offset cam portion 48 such that the tapered end 59 is retracted and thus disengaged from interference fit with the barbs or concentric rings on the stem portion 82 of each fastening device 80. Thus, the projection end 56 integral with the fixed or stationary guide portion 54 effects automatic release and ejection of the stem portion of each fastening device as the reciprocable member 58 is shifted substantially diagonally and axially or longitudinally of itself to an offset position in response to entry of the roller 60 into the offset cam portion 48. The assembly head 50 in accordance with the present invention is believed to be rugged in structure and only spring means 64 is required for effecting sharp rise and fall of roller means to follow the offset path of cam portion 48 along one side of the track 47. Mechanical sequence of operation of the components of the assembly head can be adjusted for accuracy in meeting of an oblong head portion with an aperture A in a sealing strip S according to positioning of the cam plate 46 relative to the slots 49 and bolts B and also in accordance with adjustment of coupling means 27 for the positioning of rack 26 relative to the pinion 30. The elastomeric and flexible strip means S is supported in the nest-like feeder means 68 substantially radially in alignment with the assembly head 50 and suitable chain or gear driving structure can be provided to move the feeder means 68 as required. The pair of sleeve-like reciprocable members 58 alternate between loading and inserting positions which are included in one full cycle of operation of the assembly head 50.

Figure 9:
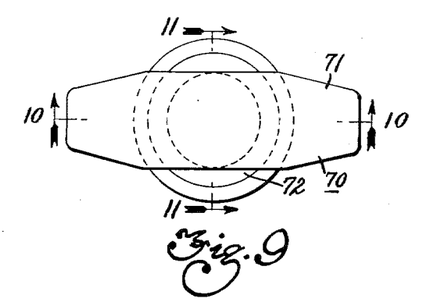
FIGURE 9 is a plan view of a fastening device insertable on a sealing strip by assembly procedure in accordance with the present invention.
Figure 10:
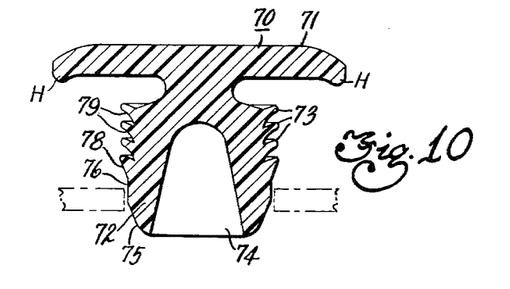
FIGURE 10 is a cross-sectioned elevational view taken along line 10—10 in FIGURE 9.
Figure 11:
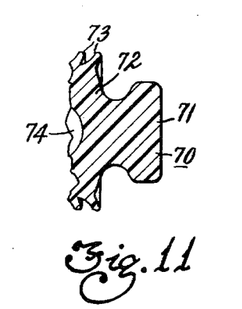
FIGURE 11 is a cross-sectioned end view taken along line 11—11 in FIGURE 9.

Details of a fastening device generally indicated by numeral 70 can be seen in further detail in FIGURES 9, 10 and 11 of the drawings. This fastening device includes an elongated or substantially football-shaped oblong head portion 71 and a stem portion 72 which together provide a body of plastic material. The head portion includes integral hook-like opposite ends H remote from each other though extending in a direction toward the stem portion. The distance or length between these hook-like opposite ends in the embodiment of the fastening means illustrated by FIGURES 9, 10 and 11 can be substantially twice the diagonal distance or diameter of a plurality of concentric barb-like rings 73 integral centrally with the stem portion 72. In the embodiment of the fastening device illustrated by FIGURES 9, 10 and 11, it is noted particularly that the stem portion 72 has a hollow interior end 74 so as to enhance resilience and facilitate flexing of an initial tapered portion 75. This initial tapered portion 75 serves as a guide for entry into a mounting panel aperture such as on a motor vehicle and an intermediate cylindrical portion 76 interconnects the initial tapered portion 75 and a secondary tapered portion 78 which extends radially outwardly still further to the outer peripheral edges of the concentric rings 73. Each of the rings 73 can be interconnected by an arcuate flared portion 79. As can be seen in the view of FIGURE 11, the head portion 71 is substantially rectangular in cross section and the hook-like opposite ends H are the only offsets provided integrally therewith.

Figure 12:
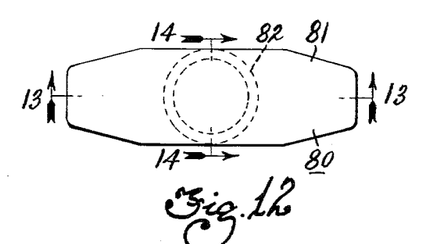
FIGURE 12 is a plan view of a fastening device similar to that of FIGURE 9.
Figure 13:
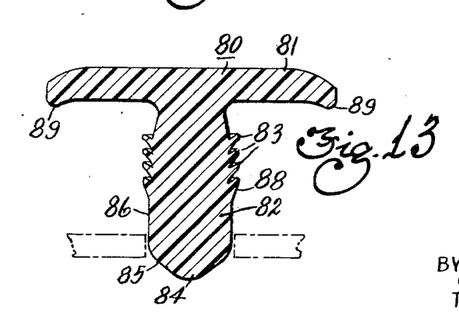
FIGURE 13 is a cross-sectioned elevational view taken along line 13—13 in FIGURE 12.
Figure 14:
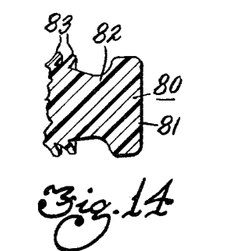
FIGURE 14 is a cross-sectioned end view taken along line 14—14 in FIGURE 12.

In views of FIGURES 12, 13 and 14 of the drawings, there is shown a fastening device generally indicated by numeral 80 having a body of plastic material including an oblong or elongated head portion 81 and integral stem portion 82 provided with concentric rings 83 with a solid bullet-shaped end 84. An initial tapered portion 85 interconnects the bullet-like end 84 and an intermediate cylindrical portion 86 adjacent to a secondary tapered portion 88. Each of the concentric rings 83 has a diameter substantially one-third the distance or length of the oblong head portion 81 between hooked ends 89 thereof.

It is to be noted that the oblong head portions 71 and 81 are substantially identical but that ratios thereof with respect to the diameters of the stem portions can differ so that different fastening devices can be assembled to elastomeric sealing strips S adapted to fit differing sizes of mounting panel apertures on various motor vehicles. Accordingly, the assembly head 50 is provided with the removable end cover 51 to permit use of reciprocable sleeve-like members 58 having different diameters along the hollow interior thereof so as to permit interference fit of concentric rings such as 73 and 83 relative to differing sleeve-like members 58 for mechanical insertion of fastening devices into holes or apertures A of elastomeric sealing strips S having the longitudinally extending cavity C along an underside thereof. Differing pairs of reciprocating members 58 can be substituted having differing diameters for hollow interiors thereof and it is also noted that for different vehicle installations hole sizes for mounting panel apertures can vary such as, for example, between 0.144 inch diameter, 0.187 inch diameter and 0.309 inch diameter.

It is to be noted that when fastening devices are assembled on a mass production basis relative to elastomeric sealing strip means, and many such fastening devices require a stop during inserting procedure, there can be a considerable loss of time which is completely avoided in accordance with the present invention by having the assembly head 50 moving concurrently with movement of the sealing strip during the inserting procedure. When thousands of fastening devices are inserted relative to longitudinally extending sealing strip means, there can be an appreciable difference in labor and operating costs encountered when additional stopping time is required subsequent to drilling or aperturing of the sealing strip means to provide lateral access to the cavity C in which the head portions of the fastening devices are to be inserted leaving only the stem portions projecting laterally to one side of the sealing strip for mounting thereof relative to a vehicle mounting panel aperture.

While the embodiments of the present invention as herein disclosed constitute preferred forms, it is to be understood that other forms might be adopted.

What is claimed is as follows:

1. In procedure for progressively assembling integrally headed nail-like fastening devices each with a stem portion and an elastomeric sealing strip having a longitudinally extending cavity adjacent to an underside thereof with access openings thereto in predetermined locations, steps comprising, feeding the fastening devices individually to a location remote from the sealing strip, temporarily retaining the stem portion of each fastening device radially outwardly on a reciprocable rocker means positioned for a time interval adjacent to the remote location such that where integrally headed each fastening device projects laterally beyond the rocker means and ultimately each can engage the predetermined access opening that is smaller than the fastening device where integrally headed in order to attain snap fit assembling, moving the sealing strip longitudinally thereof through a location at least momentarily tangential to a path of substantially arcuate configuration coinciding in a predetermined manner for fastening device transfer, rocking the integrally headed nail-like fastening device in the arcuate path while still retaining the stem portion, simultaneously and instantaneously dilating the corresponding smaller opening of the sealing strip temporarily deformed sufficiently for entry of the larger integrally headed nail-like fastening device therethrough into the cavity with snap fit assembling during said rocking, and releasing the stem portion left to project through the sealing strip opening for mounting purposes.

2. The procedure of claim 1 wherein said rocking occurs periodically in sequence during said moving of the sealing strip and at a speed of rotation tangentially slightly greater than rate of travel of the sealing strip in order to permit the integrally headed fastening device to elongate the smaller access opening to the cavity sufficiently for mounting entry of the larger integrally headed fastening device thereto.

3. A procedure for progressively assembling individually one of a plurality of nail-like plastic fastening devices each having an oblong head portion of leading and trailing edging longitudinally with a stem portion integrally on one side thereof in an intermediate location to complement an elastomeric sealing strip having an elongated body including a cavity therein to which access is possible through pre-determined lateral openings each smaller than the head portion of the fastening device in order to attain snap fit assembling, steps of transferring the stem portion from a supply path onto an arcuately-movable rocking means that temporarily retains the stem portion in a substantially radial position as to the rocking means, shifting the rocking means periodically at least to include a substantially semi-circular change in fastening device positioning during which the leading edging of the oblong head portion engages one access opening of the sealing strip, feeding the sealing strip longitudinally in a direction substantially tangential to the semi-circular change in fastening device positioning at a difference in rates of relative movement sufficient for the larger head portion to elongate the sealing strip to permit trailing edging of the head portion to enter the cavity through the particular normally smaller opening, and releasing the stem portion left to project freely from the sealing strip snugly snap fitted together for subsequent vehicle installation.

4. The procedure of claim 3 wherein both said feeding of the strip means and said shifting with substantially semi-circular change in fastening device positioning occur dynamically and simultaneously free of any multi-station full stopping of movement of the sealing strip.

References Cited by the Examiner

UNITED STATES PATENTS

| | | | |
|---|---|---|---|
| 2,050,074 | 8/36 | Trytten | 29—429 |
| 2,118,817 | 5/38 | Laursen | 29—450 |
| 2,716,804 | 9/55 | Johnson | 29—453 |
| 2,780,128 | 2/57 | Rapata | 85—5 |
| 2,927,497 | 3/60 | Rapata | 85—5 |
| 2,972,789 | 2/61 | Matthues | 29—453 |
| 2,987,812 | 6/61 | Donaldson | 29—453 |

WHITMORE A. WILTZ, *Primary Examiner.*

THOMAS H. EAGER, *Examiner.*